US006590203B2

(12) United States Patent
Kato

(10) Patent No.: US 6,590,203 B2
(45) Date of Patent: Jul. 8, 2003

(54) ION TRAP MASS SPECTROSCOPY

(75) Inventor: Yoshiaki Kato, Mito (JP)

(73) Assignee: Hitachi, Ltd., Tokyo (JP)

( * ) Notice: Subject to any disclaimer, the term of this patent is extended or adjusted under 35 U.S.C. 154(b) by 33 days.

(21) Appl. No.: 09/725,533

(22) Filed: Nov. 29, 2000

(65) Prior Publication Data

US 2002/0027195 A1 Mar. 7, 2002

(30) Foreign Application Priority Data

Dec. 2, 1999 (JP) .......................................... 11-342835

(51) Int. Cl.[7] .......................... B01D 55/44; H01J 49/00
(52) U.S. Cl. ...................................................... 250/282
(58) Field of Search ................................ 250/282, 292

(56) References Cited

U.S. PATENT DOCUMENTS 2,939,952 A 6/1960 Paul et al.
4,749,860 A * 6/1988 Kelley et al. ............... 250/282
5,196,699 A * 3/1993 Kelley ........................ 250/282
5,206,507 A * 4/1993 Kelley ........................ 250/282
5,517,025 A * 5/1996 Wells et al. ................ 250/282
6,147,348 A * 11/2000 Quarmby et al. ........... 250/292

FOREIGN PATENT DOCUMENTS

| | | |
|---|---|---|
| JP | 60-32310 | 7/1985 |
| JP | 8-21365 | 3/1996 |
| JP | 10-213566 | 8/1998 |

* cited by examiner

*Primary Examiner*—Bruce Anderson
(74) *Attorney, Agent, or Firm*—Kenyon & Kenyon

(57) ABSTRACT

The present invention relates to analysis of organic compounds using an ion trap mass spectrometer. Substantially, the method of the present invention comprises steps of isolating ions of a wide mass range including isotope peaks, performing CID (Collision Induced Dissociation) on a plurality of ions simultaneously to produce daughter ions, obtaining the mass spectrum of the daughter ions, accumulating ionic currents of isotope peaks of the obtained daughter ions, comparing the result by the isotope pattern of the daughter ions, and evaluating the result of analysis.

11 Claims, 11 Drawing Sheets

ION TRAP MASS SPECTROSCOPY

BACKGROUND OF THE INVENTION

The present invention relates to a mass spectrometer using an ion trap.

The recent environmental pollution by chemical substances has been a serial social problem. Particularly it is one of the most important and urgent items to find a behavior of dioxin in the environment. The dioxin series are isomers having di-oxyn structures whose hydrogen atoms are substituted by chlorine atoms. Particularly among dioxin series, 2,3,7,8 tetra-chloro di-benzo dioxine (2,3,7,8 TCDD) is a strongest carcinogenic and high toxic substance and its diffusion into the environment is looking serious. The environmental pollutants like the dioxin series are extremely little in much complicated systems. Therefore, high-sensitivity apparatus is required to detect and analyze such a little amount of dioxin series for prevention of dioxin series from diffusing into our environments.

The dioxin series referred to in this invention is a generic name for poly-chloro di-benzo para-di-oxin (PCDDS) and poly-chloro di-benzo furan (PCDFs).

The analysis of such chemical substances requires much complicated and very time-consuming pretreatment. Further this kind of analysis must have extremely high sensitivity and selectivity to identify the target substances among coexisting substances. For this reason, a gas chromatograph mass spectrometer (GC/MS) has been widely used which has a gas chromatographic unit for separating substances before the mass spectrometer.

Recently, ion trap mass spectrometers have attracted considerable attention as mass spectrometers. Typical examples of ion trap mass spectrometers are disclosed by U.S. Pat. No. 2,939,952 and Japanese Patent publication No. 60-32310(U.S. Pat. No. 1,321,036), 8-21365, and Japanese Patent Application Laid-Open No. 10-213566.

One of the greatest problems in analysis of dioxin series is that various kinds of interfering substances (e.g., chlorinated pesticides such as PCB and DDT) are left in samples without being removed by the complicated pretreatment. Such interfering substances cannot be removed even by chromatographic capillary columns, dissolve together with the dioxin series in the same retention time period, and are detected by the mass spectrometer. Such interfering substances in analysis are called chemical noises. The chemical noises appear in all mass range of the mass spectroscopy and make it difficult to identify signals of a trace of dioxin.

FIG. 11 shows a mass spectrum having a magnified molecular region of dioxin. In this spectrum, the white bars are for chemical noises and the solid bars are for dioxin signals for easy recognition. (Actual machines use different indications.) As seen from this spectrum, dioxin signals are overlapped by chemical noises. However, the resolution of the ion trap mass spectrometer.

Chemical noise patterns are dependent upon samples and analyses and chemical noises disturb analysis of dioxin as far as they coexist. A high-resolution double-focusing mass spectrometer employing large-scale magnetic and electric fields are used to pick up dioxin signals from chemical noises according to a trifle mass difference between the dioxin and the chemical noises such as PCB and DDT. However, the high-resolution double-focusing mass spectrometer is very expensive, complicated to operate and requires a long and special experience.

Besides analysis by the high-resolution double-focusing mass spectrometer, various analytical methods have been tried to make the analysis quicker and easier. Typical ones of such methods are analysis by a small mass spectrometer and a MS/MS method by an ion trap mass spectrometer.

Although a sample, for example dioxin, is a chemically-stable compound, it gives a unique cleavage when a Collision Induced Dissociation (CID) is performed on dioxin series by the MS/MS method. From a precursor ion having a mass of M, is produced a daughter ion having a mass of M-63 (by reducing COCl from a molecular ion $M^+$) by cleavage. This is a unique cleavage pattern of the dioxin series (PCDD and PCDF). To check the existence of dioxin, it is required to identify and isolate the precursor ion M, produce the daughter ion M-63 by the CID, and detect it. This MS/MS method can distinguish dioxin signals from chemical noises and increase selectivity of the signals even when the resolution of the ion trap mass spectroscopy is not enough.

However, in spite of this high distinguishing performance, the MS/MS method has demerits shown below.

The MS/MS method comprises a precursor ion isolating step, a CID (Collision Induced Dissociation) step, and a mass spectroscopy step and each step has a problem. In the precursor ion isolating step, the operator must judge whether the target precursor ions are not lost at all or whether the precursor ions are completely isolated (or whether only single-mass ions are left in the ion trapping space or whether ions of the other mass coexist in the ion trapping space). However, the conventional MS/MS method provides no information to help the operator to judge the existence of a loss in isolation of precursor ions and the degree of isolation. Therefore, even when the isolation status changes according to the operating conditions of the machine, the operator cannot know the change during and after the measurement. It is very hard to keep the identical operating conditions of the machine.

The CID causes the excited precursor ions to collide with helium gas atoms and to cleave themselves. Therefore, the CID is a kind of chemical reaction. To exactly know how efficiently this chemical reaction advances is always required for exact quantitative analysis. However, the conventional MS/MS method singly measures standard substances in advance and never provides any information of CID efficiency.

There is another method of using internal standard substances to partially solve the above problems (pertaining to isolation of precursor ions and CID efficiency). Compounds containing stable isotopes are used as internal standard substances because the structures of the standard compounds must not be so different from that of the sample. For example, the internal standard substance for analysis of TCDD is a compound obtained by substituting all carbons of the dioxin structures by 13C. In this case, the mass difference between the sample TCDD and the internal standard substance 13-TCDD is 12. First the sample TCDD is MS/MS-analyzed and then the internal standard substance 13C-TCDD is MS/MS-analyzed. Dioxin isomers having four or more chlorine atoms are very toxic. In other words, there are five dioxin isomers of different masses which are very toxic. In actual dioxin analysis, these five dioxin isomers and five internal standard substances (a total of ten substances) must be MS/MS-analyzed. One MS/MS analysis (measurement) takes about 0.2 second. This means that ten serial MS/MS measurements (a cycle) require 2 seconds.

Further, for quantitative analysis of a single ingredient, at least ten chromatographic peaks must be sampled. Sampling of ten points of a single ingredient requires 20 seconds (assuming that 1 cycle takes 2 seconds). The GC chromatography is not good for exact quantitative analysis because a dioxin peak dissolves about 5 seconds. Contrarily, the cycle of measurement must be 0.5 second or less (a cycle). Further, for detailed analysis, measurement of internal standard substances is required. However, this singly prolongs the cycle of measurement and is far from exact quantitative analysis.

FIG. 8 shows steps of a conventional MS/MS method on TCDDs and internal standard substances. Step (1) (Ionization step) ionizes TCDDs and internal standard substances together.

Step (2) isolates a selected ion (m/z332, etc.) of the internal standard substance as a precursor ion. Step (3) cleaves the selected ion m/z332 by CID to produce the daughter ion m/z268 and measures the current of the daughter ion from the mass spectrum. Next, the sample measurement steps follow. Step (4) ionizes the sample TCDD and the internal standard substance, selects and isolates the precursor ion (m/z320, etc.) from TCDD ions (Step (5)). Step (6) cleaves the precursor ion (m/z320) of the isolated TCDD by CID into a daughter ion (m/z257). These steps (1) to (6) are repeated for example, five more times to measure all dioxin isomers having 4 to 8 chlorine atoms.

As stated above, the quantitative analysis using the conventional MS/MS method has demerits that the number of samples to be measured is limited, that the time for measurement is prolonged, and that the operator cannot judge whether the MS/MS method is done correctly.

SUMMARY OF THE INVENTION

An object of the present invention is to provide high sensitivity and high reliability mass spectroscopic method for dioxin series and other sample, improving the conventional MS/MS methods.

The present invention is related to amass spectroscopic method using a ion trap mass spectrometer. This method leaves ions of two mass ranges or more in the ion trapping space, excludes the other ions, performs CID on the trapped ions, and detects the currents of the resulting daughter ions.

DETAILED DESCRIPTION OF THE PREFERRED EMBODIMENTS

Figure 1:
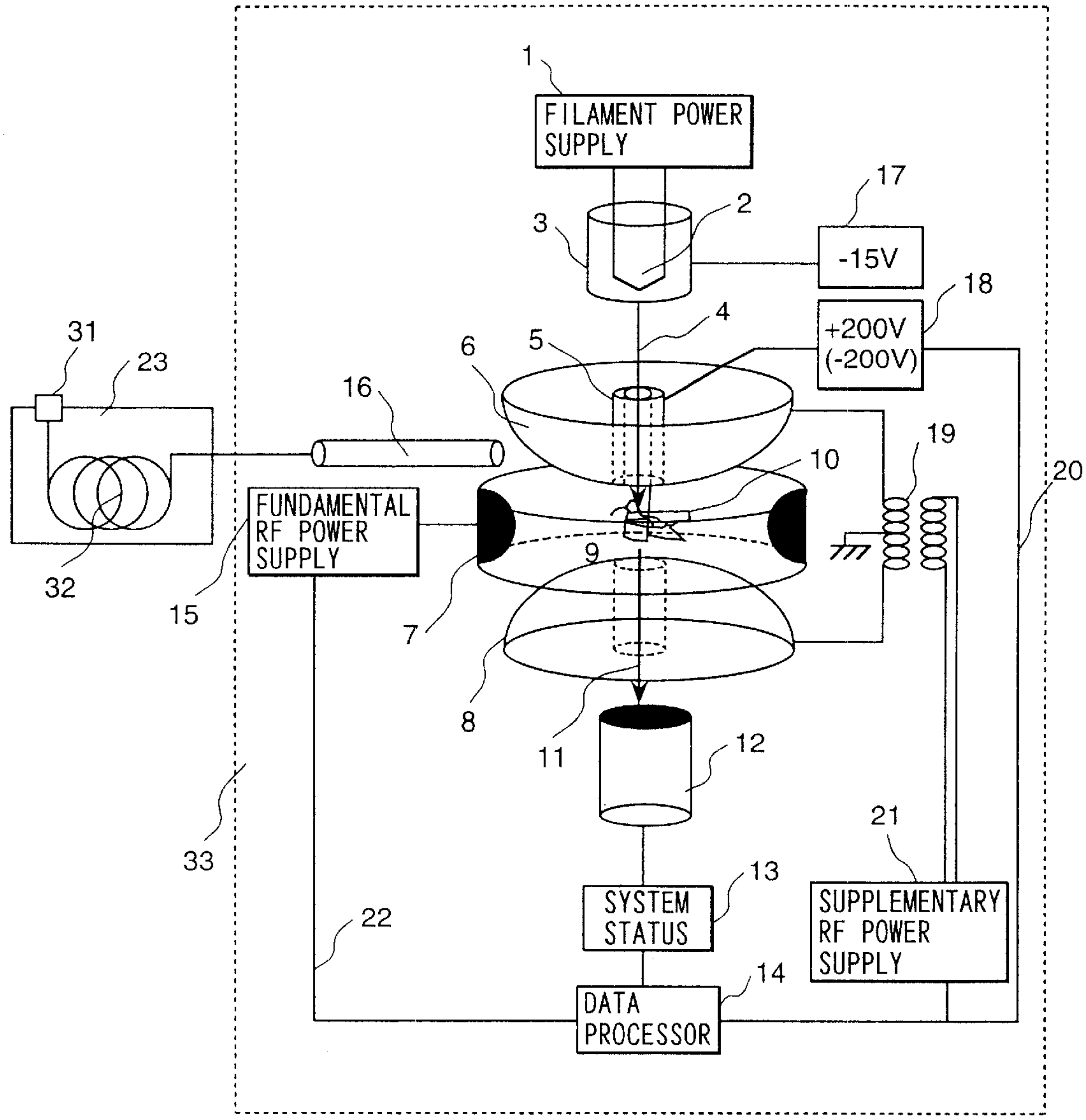
FIG. 1 is a schematic block diagram of an ion trap mass spectrometer to explain one embodiment of the present invention.

An embodiment of the present invention will be explained with reference to the accompanying drawings.

The ion trap mass spectrometer comprises a ring electrode and two end cap electrodes 6 and 8. When a fundamental RF is applied to the ring electrode 7 from the fundamental RF voltage generator (RF source), a three dimensional quadruple electric field which can trap ions of a selected mass range is formed in the ion trapping space 9. When electrons 4 are emitted from a filament 4 heated by a filament power source 1 into this ion trapping space 9 to ionize sample molecules or when ions are injected into this ion trapping space 9, ions of a selected mass range is steadily trapped in this space 9. When the fundamental RF voltage is scanned, the ions trapped in the space 9 become unstable in the order of masses and ejected from the space 9 in sequence. The ejected ions 11 are detected by a detector 12 and give a mass spectrum. These steps (between ionization and detection) are repeated for mass spectroscopic analysis.

With the MS/MS steps added to the above procedure of measurement, the ion trap mass spectrometer can perform the same MS/MS analysis as disclosed in Japanese Non-examined Patent Publication H08-21365 (1996).

The MS/MS method mainly comprises steps of ionizing a sample, trapping ions of a selected mass range in the ion trapping space 9, selecting and isolating target ions (precursor ions), resonance-exciting the ions for cleavage, and obtaining the resulting daughter ions. This method is widely used to obtain information on the structure of the precursor ions. This method can also reduce chemical noises dramatically because it has many steps (equivalent to signal filters) such as isolation of precursor ions, excitation and cleavage, and selection and detection of daughter ions.

A sample solution is injected through an injector 31 of the gas chromatographic unit 23, vaporized, and carried by a helium gas into the capillary column 32. In the capillary column 32, the ingredients of the sample gas are isolated individually according to differences of partition between the gas (helium) and the liquid phase coating on the inner wall of the column. The isolated ingredients are transferred to the ion trap mass spectrometer 33 which is in a vacuum container through a gas guide pipe 16. The ion trap mass spectrometer 33 comprises a filament 2, an electron gate (electrode) 5, an end cap electrode 6, ring electrode 7, an end cap electrode 8, a detector 12, a D.C. amplifier 13, fundamental RF voltage generator 15, and a data processor 14. The ring electrode having a hyperboloid of revolution and two end cap electrodes 6 and 8 on both sides of the revolutional axis of the ring electrode constitute the core of the ion trap mass spectrometer. A fundamental RF voltage is applied between the ring electrode 7 and each of the end cap electrodes 6 and 8. As the result, a three-dimensional quadruple electric field for trapping ions is formed in the space 9 surrounded by these three electrodes. This space is called an ion trapping space. A supplementary RF of 0 V to about 10 V is applied to the end cap electrodes 6 and 8 from the supplementary RF voltage generator (supplementary RF source) 21 through a transformer 19.

The ion trap mass spectrometer has some steps (modes) to be individually executed as the measurement advances. A time period (one cycle) to get one mass spectrum is 0.1 second to a few seconds.

The fundamental RF voltage generator 15 and the electron gate power supply 18 are controlled by signal lines 22 and 20 coming from the data processor 14.

The electron accelerating power supply 17 supplies a voltage of −15V to the filament 2 disposed outside the end cap electrode 6 and to the grid electrode which encloses the filament. The electron gate 5 is placed between the filament 2 and the end cap electrode 6 and the electron gate power supply 18 applies a voltage of about +200 V (−200 V) to the electron gate 5. Thermal electrons 4 emitted from the filament 2 are accelerated by a potential between the electron gate 5 and the filament 2 and fed into the ion trapping space 9 through an aperture in the center of each end cap electrode. The thermal electrons collide with the molecules of the sample gas which is fed into the space 9 from the gas chromatographic unit (GC) 23 through the gas guide pipe 16 and ionizes the sample gas molecules. The produced ions form a stable ion displacement 10 in the ion trapping space 9 and is trapped in the space 9. During ionization (10 microseconds to 0.1 second), electrons are fed into the ion trapping space 9 to continue ionization and store ions.

Figure 7:
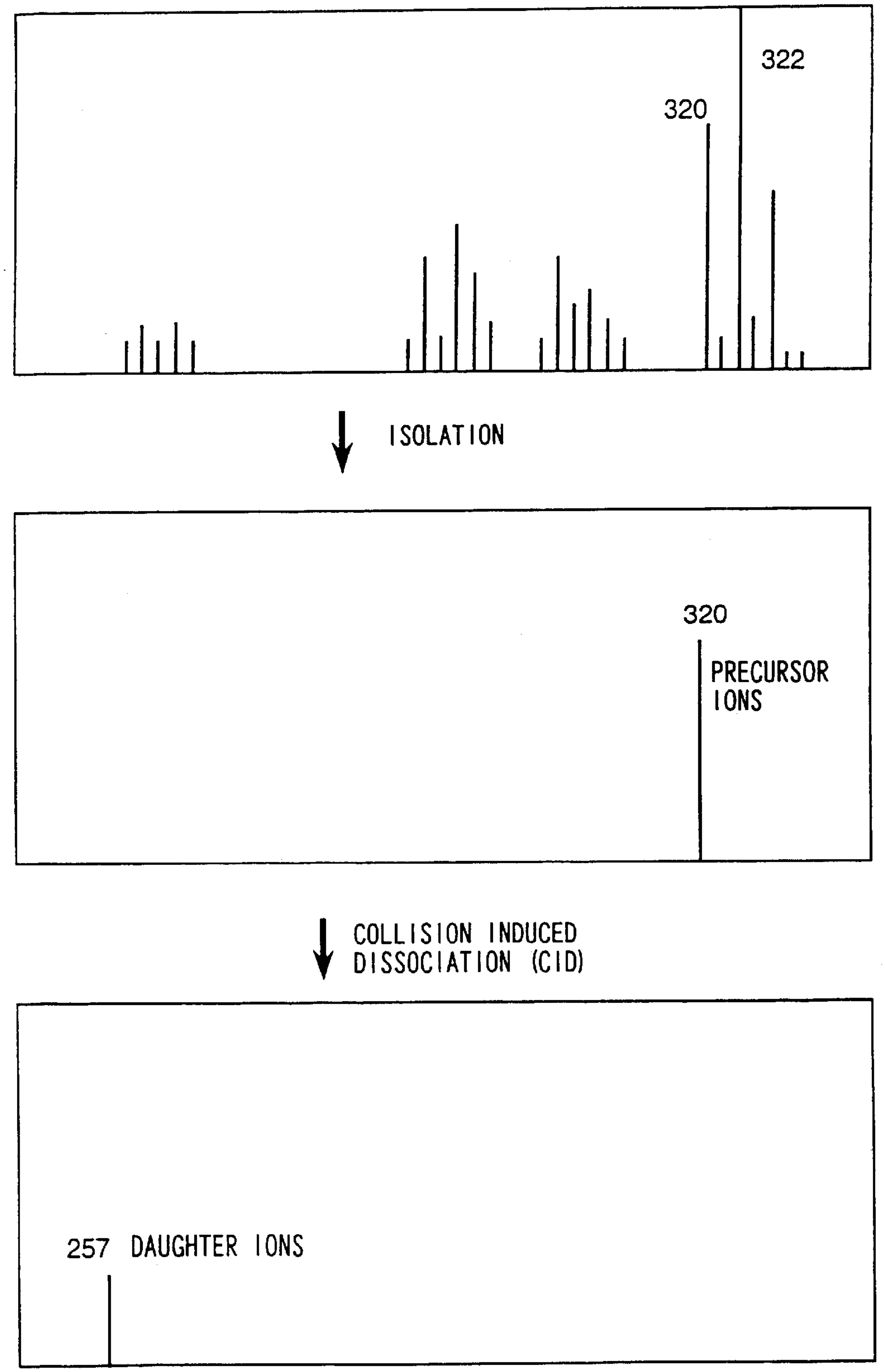
FIG. 7 is a graph to explain the conventional MS/MS method.
Figure 8:
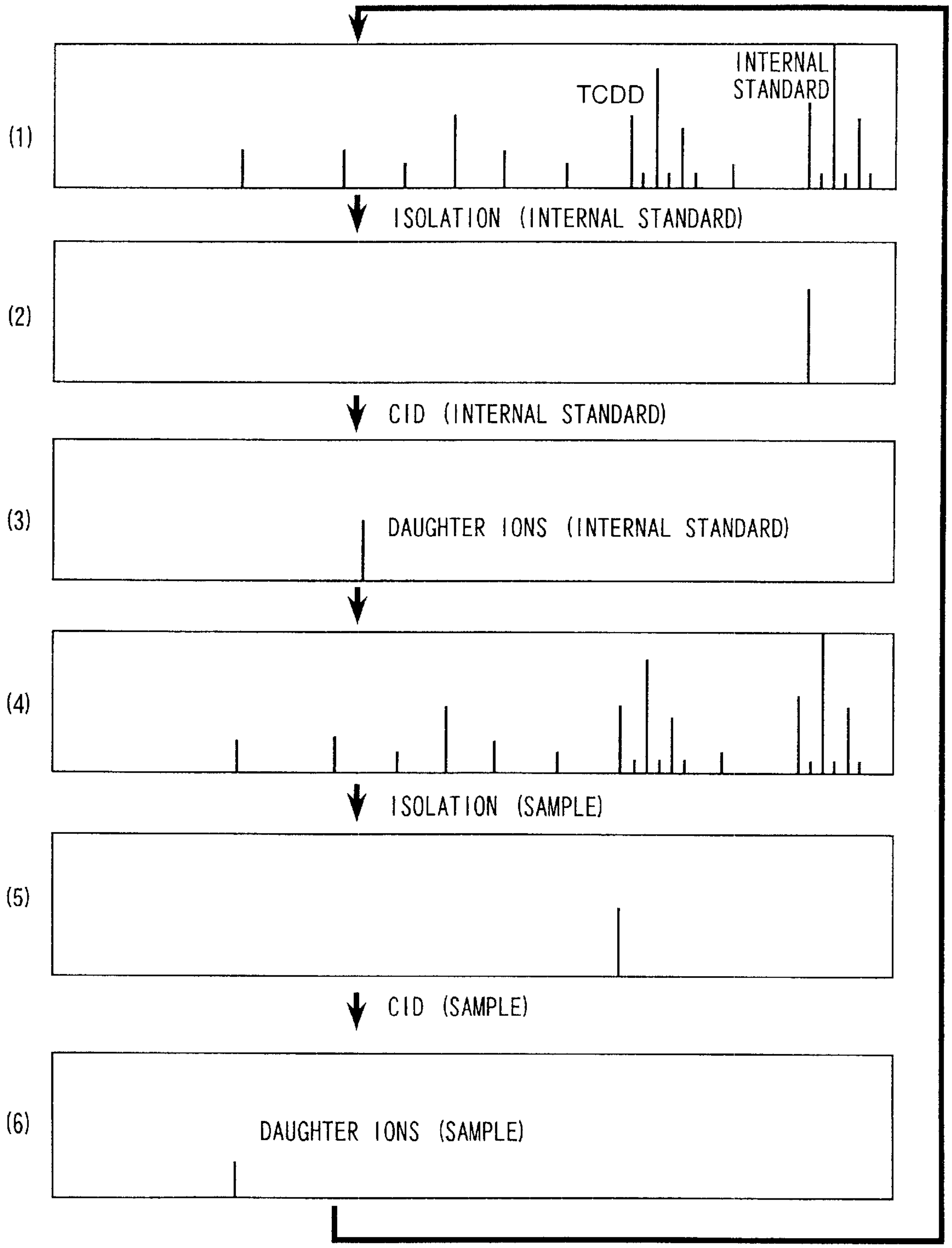
FIG. 8 is a graph to explain the conventional MS/MS method.

For comparison, FIG. 7 shows an example of analysis of dioxin by the conventional MS/MS method. As shown on the top of FIG. 7, the mass spectrum of dioxin contains a lot of chemical noises. For analysis of TCDD, the molecular ions appear in a wide mass range between m/z320 and m/z326. This comes from isotopes of chlorine. First let's assume that the precursor ion is m/z320. To isolate m/z320, other ions are excluded as shown on the center of FIG. 7. When m/z320 is excited and cleaved, a daughter ion mass spectrum is obtained (see the bottom of FIG. 7). The daughter ion singly appears on m/z257. The current of this daughter ion is measured for quantitative measurement of TCDD.

As shown in FIG. 1, the ions trapped in the ion trapping space 9 of the ion trap mass spectrometer 33 are steadily trapped while vibrating at a secular frequency (motion) ω corresponding to the mass of the ion. The secular frequency ω is expressed by (1).

$$\omega=\beta\Omega/2 \quad (1)$$

wherein Ω is a frequency of the fundamental RF applied to the ring electrode and β is a constant depending upon the mass. β is 1 for ions of a minimum mass that can be trapped in the ion trapping space 9 or 0 for a maximum mass that can be trapped in the ion trapping space 9. Therefore, β is a value between 0 and 1 (including both). If a fundamental RF frequency applied to the ring electrode 7 is 1 MHz, ω can be a value ranging from 0 to 500 kHz. Ions of low masses vibrate at higher frequencies and ions of high masses vibrate at lower frequencies (slowly).

When a supplementary a.c. is applied between two end cap electrodes 6 and 8 from the supplementary AC power source 21 through the transformer 19, a dipole electric field generates in the ion trapping space 9. When the frequency of the dipole electric field becomes equal to the secular frequency of the ion, the ion resonates, absorbs energy from the dipole electric field and abruptly increases the amplitude of the secular frequency. The ions in the ion trapping space 9 collide with helium atoms in a gas form of about 0.1 Pa in the ion trapping space 9 and lose its kinetic energy. While these resonance and collision steps are repeated, part of the kinetic energy is converted to the internal energy of the ion and stored there. When the stored internal energy of the ion exceeds the bonding energy of the atoms in the ion, the ion cleaves into fragmental ions (called daughter ions or product ions) of smaller masses. This process is called "Collision Induced Dissociation" (CID). Due to this CID, a supplementary a.c. voltage applied to the end cap electrodes is 0.5 V to about 1.5 V. If this voltage is 3 V or more, the ions are excited by resonance and their displacement will be greater than the ion trapping space 9. Finally, the ions may hit the inner walls of the end cap electrodes 6 and 8 or will go out through the center hole of each end cap electrode.

Figure 2:
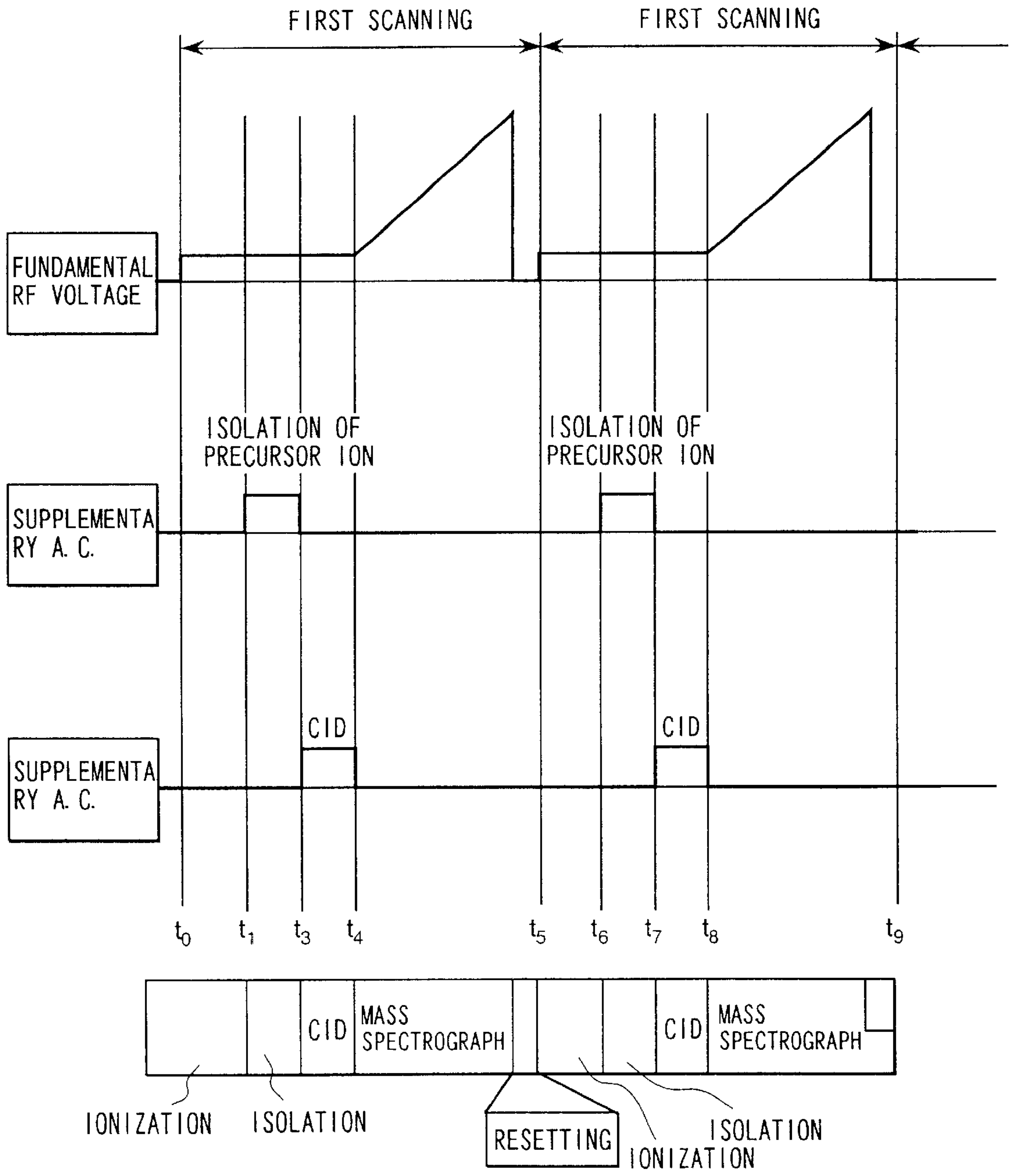
FIG. 2 is a graph showing the operational sequence of the ion trap mass spectrometer.
Figure 3:
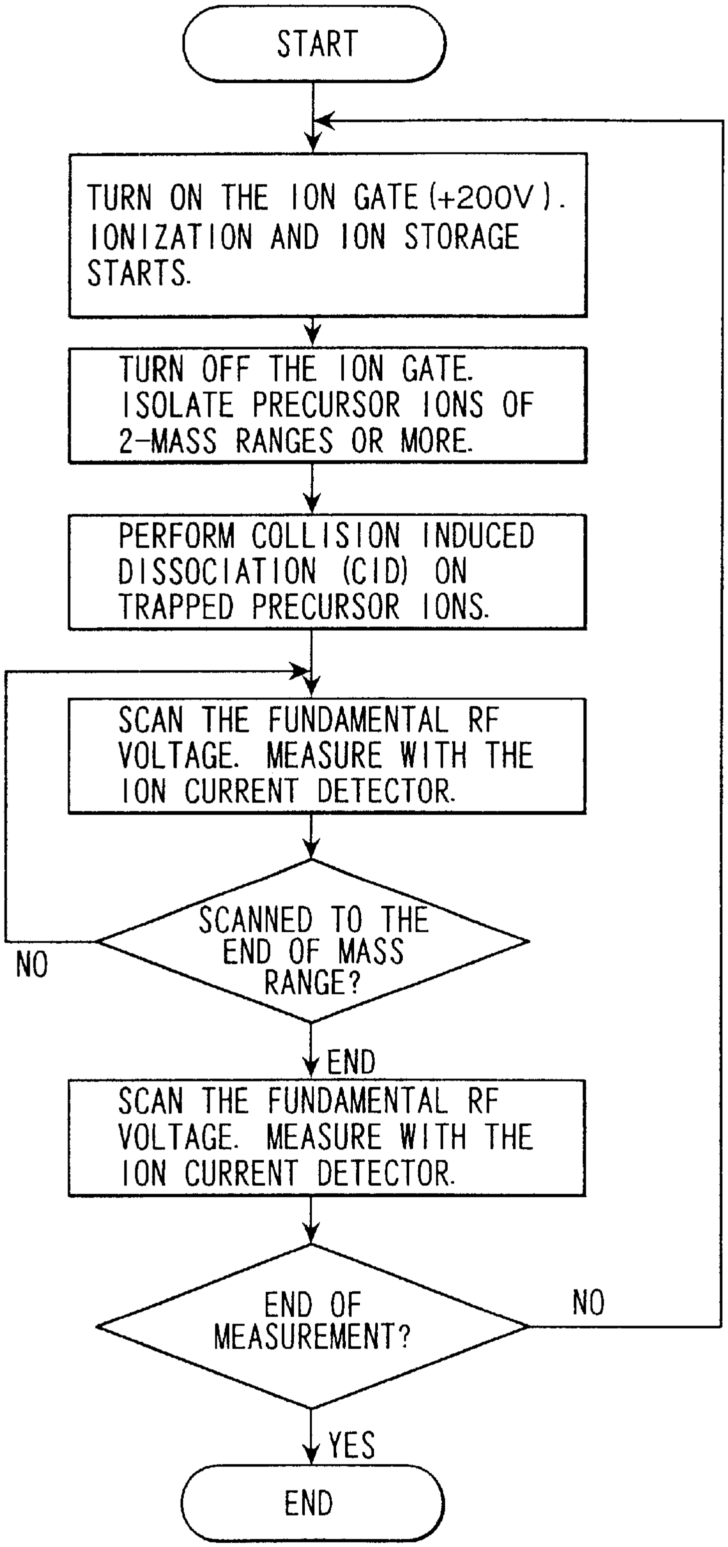
FIG. 3 is an operational flow of one embodiment of the present invention.

FIG. 2 shows the operational sequence of the embodiment in accordance with the present invention and FIG. 3 shows an operational flow of one embodiment of the present invention. Below will be explained the analyzing method of the present invention referring to these figures.

The ion trap mass spectrometer has some steps (modes) to be individually executed as the measurement advances.

(1) Step for Ionization ($t_0$ to $t_1$, $t_5$ to $t_6$, . . . )

Figure 6:
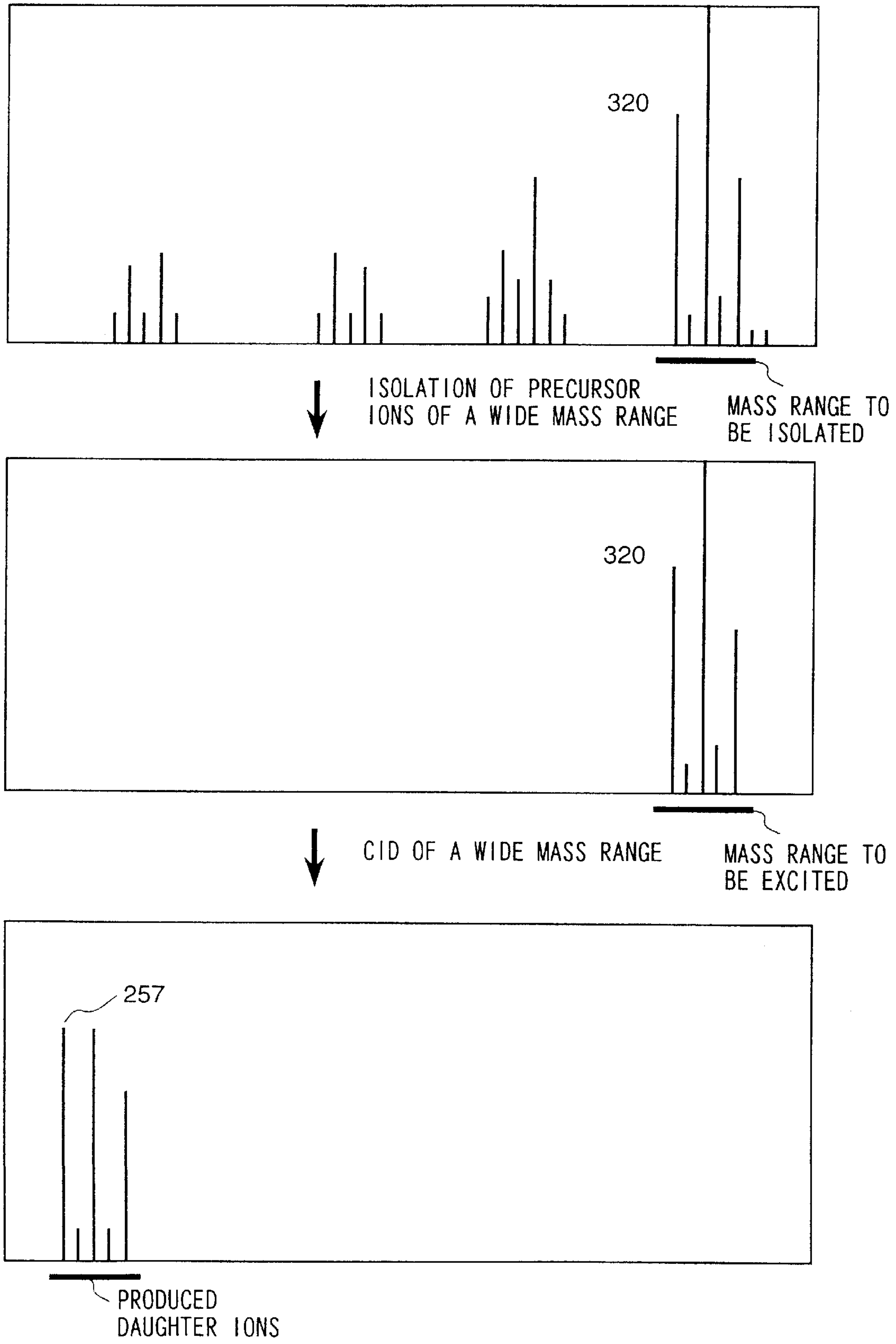
FIG. 6 is a graph to explain one embodiment of the present invention.

This step applies a voltage of +200 V to the electron gate 5 and starts ionization of a sample. In this case, the fundamental RF voltage is comparatively low. With this, the ion trapping space 9 can store ions of a wide mass range. As shown in FIG. 6, the signals of dioxin are mixed in with chemical noises.

(2) Step for Isolation of Precursor Ions in a Selected Mass Range ($t_1$ to $t_2$, $t_6$ to $t_7$, . . . )

At the end of ionization (at $t_1$), this step applied a voltage of −200 V to the electron gate 5 to prevent electrons from entering the ion trapping space 9. Then the step varies the quadruple electric field by the same method as disclosed in Japanese Non-examined Patent Publications H8-21365 to keep the ions of a selected mass range in the trapping space. In other words, the other ions outside the selected mass range are excluded from the trapping space 9.

Figure 10A:
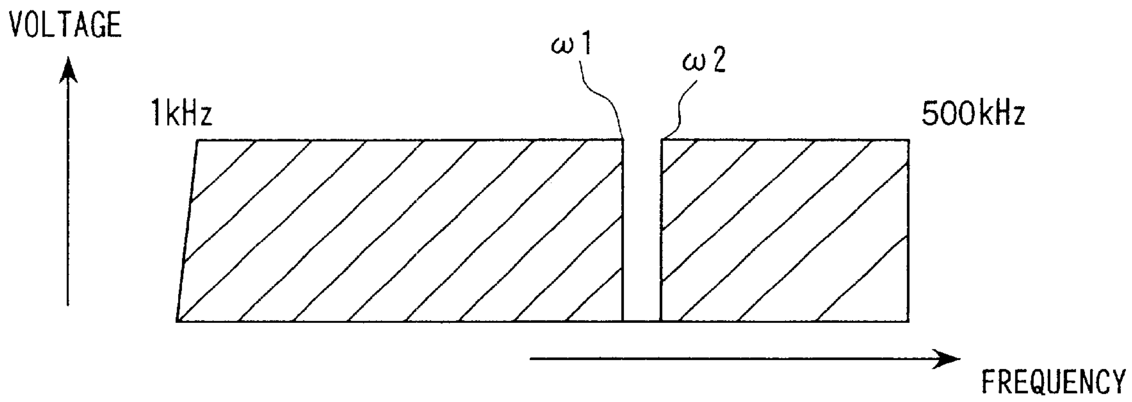
FIG. 10 is a graph to explain the notched wide band noise.
Figure 10B:
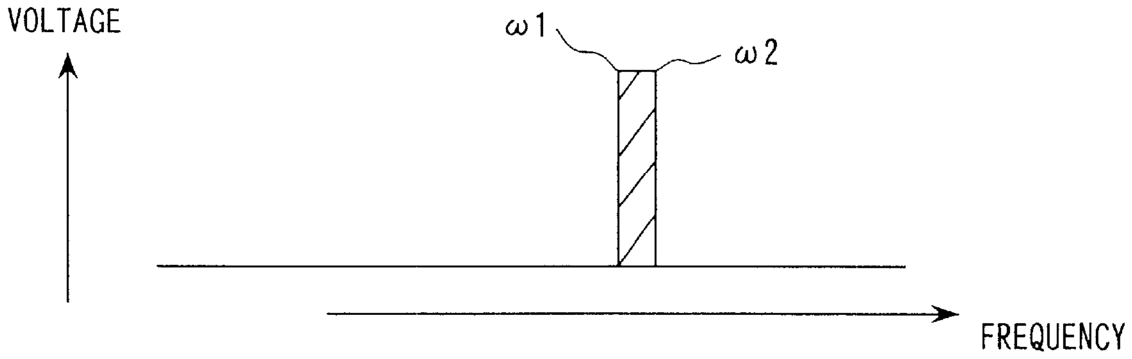
Figure 11:
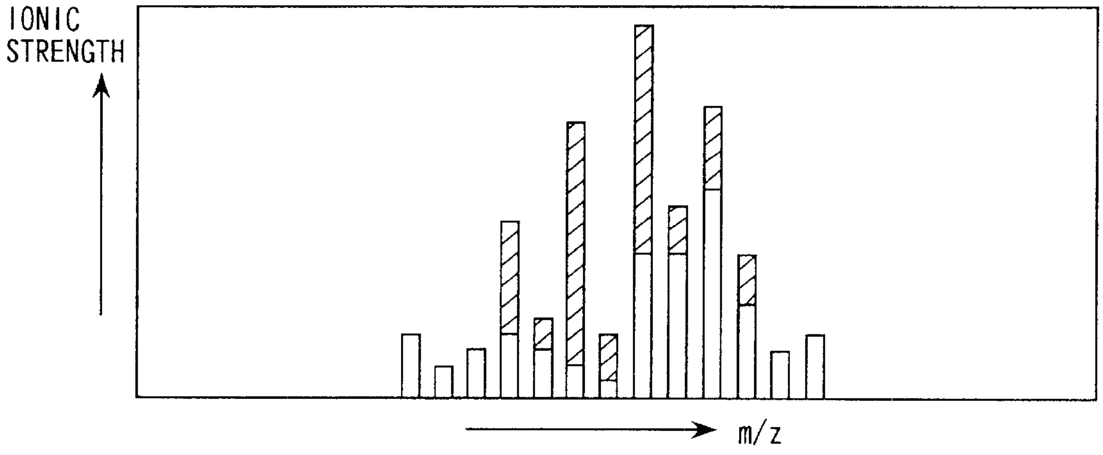
FIG. 11 shows a mass spectrum having a magnified molecular region of dioxide.

It is also possible to apply a supplementary a.c. to the end cap electrodes to isolate ions. Namely, a wide-band noise having a notch as shown on the top of FIG. 10 is applied as the supplementary a.c. FIG. 10 has a horizontal line for frequencies and a vertical line for voltages. The wide-band noise contains consecutive frequency components of 1 kHz to ω1 and ω2 to 500 kHz, but contains no a.c. component between botch frequencies ω1 and ω2. The supplementary a.c. voltage can be 3 V to 10 V. When a wide-band noise containing this notch is applied to the end cap electrodes, the ion trapping space 9 holds ions (between masses m1 and m2) having a peculiar frequency (motion) corresponding to the notch frequencies between ω1 and ω2. Other ions are excited by resonance with the supplementary a.c. and excluded from the ion trapping space 9.

For example, for analysis of TCDD, ions between m/z320 and m/z324 are left in the ion trapping space 9 as shown on the top and center of FIG. 6 and other ions are excluded from the space 9.

(3) Step for Collision Induced Dissociation (CID) ($t_2$ to $t_3$, $t_7$ to $t_8$, . . . )

This step applies a supplementary a.c. having a noise component as shown on the bottom of FIG. 10. The noise contains frequency components of ω1 to ω2. In other words, the applied supplementary a.c. has a wide frequency range corresponding to the peculiar frequencies of ions left in the ion trapping space 9. The supplementary a.c. to be applied contains frequencies between the peculiar frequency of the maximum mass and the peculiar frequency of the minimum mass. The supplementary a.c. voltage to be applied can be about 1.5 V. For analysis of TCDD, this supplementary a.c. application excites ions between dioxin masses 320 and 324 at a time and cleaves them into daughter ions. The CID time is a few milliseconds to a few ten milliseconds. As shown on the center and bottom of FIG. 6, the isolated ions (m/z320 to m/z324) of the wide mass range are CIDed at a time by application of the supplementary a.c. and cleaved to daughter ions.

(4) Step for Mass Spectroscopy

At the end of the CID time, the supplementary a.c is turned off. This step starts scanning of the fundamental RF voltage by an instruction from the data processor 14 and detects ions in the order of masses by the detector 12. The detected ion current is sent to the data processor 14 through the d.c. amplifier 13 and collected into a mass spectrum. The details of the mass spectrum collection have been disclosed in Japan Patent 1,321,036 and Japanese Non-examined Patent Publications H8-21365.

(5) Step for Resetting

At the end of a preset mass range or scanning, the fundamental RF power generator is reset to a zero. With this, all ions in the ion trapping space 9 are excluded from the space 9. Then the next scanning starts. The above steps (1) to (6) are repeated to get a mass spectrum.

Figure 5:
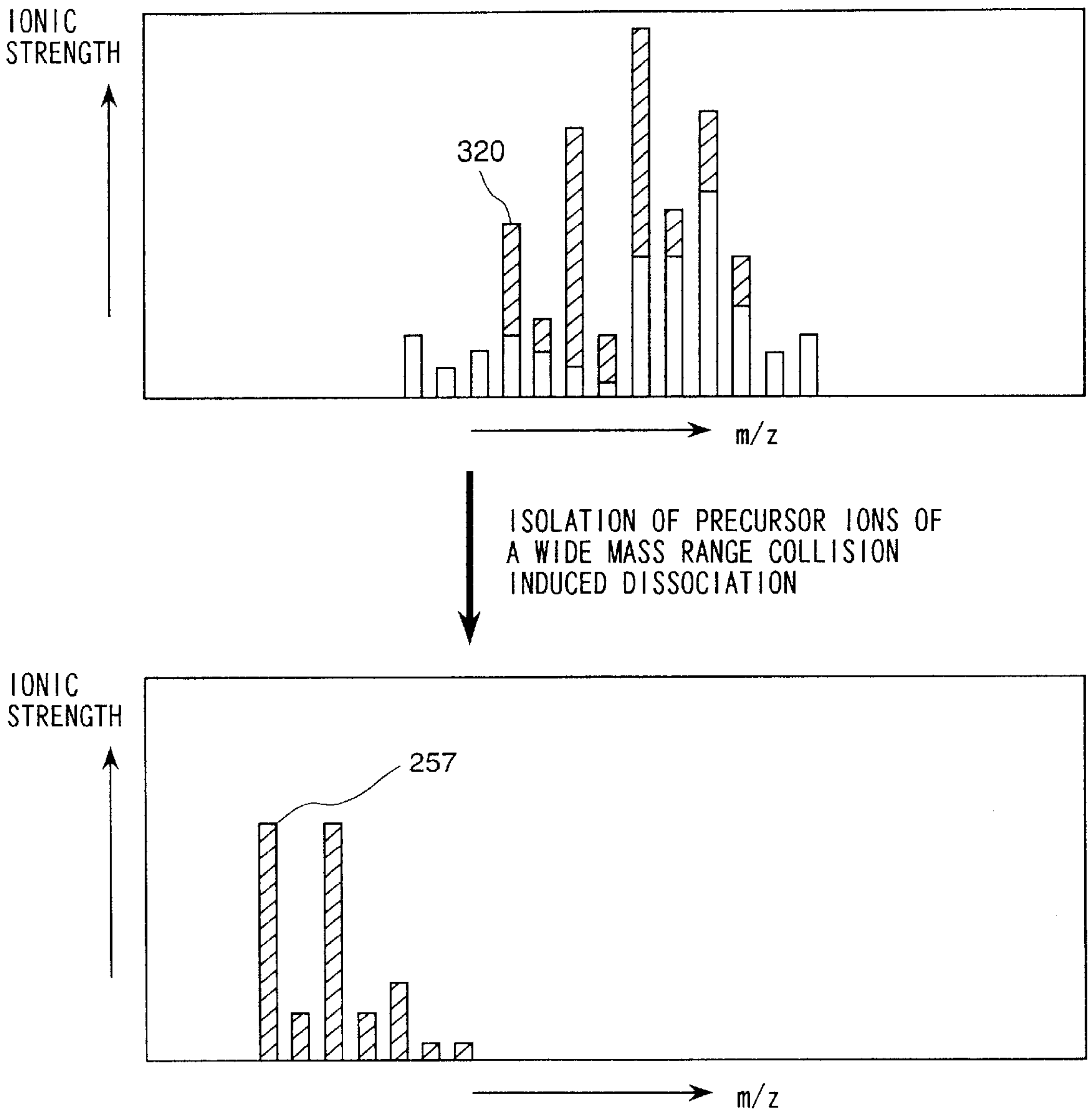
FIG. 5 is a graph to explain one embodiment of the present invention.

When a supplementary a.c with white noises is applied in the CID step, the mass spectrum of dioxin whose signals are mixed in with chemical noises turns into a daughter ion mass spectrum having less noise as shown on the bottom of FIG. 5, when the CID is performed on all isotope peaks of molecular ions simultaneously, the resulting daughter ions have isotope patterns corresponding to the isotopes. As TCDD has four chlorine atoms in one TCDD molecule, the molecular ions indicate the ratio of intensities of 3:4:2 every 2 masses as shown in the center of FIG. 6. Further, the daughter ion is smaller than the molecular ion by COCl, the daughter ion has three chlorine atoms (per molecule). Therefore, the daughter ions indicate the isotope ratio of 3:3:1 every two masses as shown on the bottom of FIG. 6.

For CIDs on compounds (e.g., dioxin) having isotope patterns in wide mass ranges, if ions of a single mass are isolated as shown in FIG. 7, information of the other isotope peaks may be discarded. In the present invention, the daughter ions appear between m/z257 and m/z261. Peaks m/z257, m/z259, and m/z261 have high intensities and their ratio is clearly 3:3:1. By accumulating mass peaks whose isotope ratio is 5% or more or 10% or more among daughter ions and quantitatively analyzing with this sum, the total amount of signals will increase and smaller amounts of substances can be measured. As for TCDD, the ratio of the current of the single m/z257 ion to the total currents of all daughter ions is about 38%. If the currents of all daughter ions of 5% or more (in isotope ratio) are accumulated, the result may be 92% of the total currents of all daughter ions. Similarly, if the currents of all daughter ions of 10% or more (in isotope ratio) are accumulated, the result may be 88% of the total currents of all daughter ions. As seen from this, accumulating currents of ions whose isotope ratio is great is more advantageous by several times than quantitative analysis of a single ion. In actual analyses, it is preferable to determine an isotope ratio limit of 5% to 10% and quantitatively calculate the ions over the limit.

When the isotope peaks are MS/MS-processed simultaneously, the isotope patterns of the resulting daughter ions are also shown.

Figure 4:
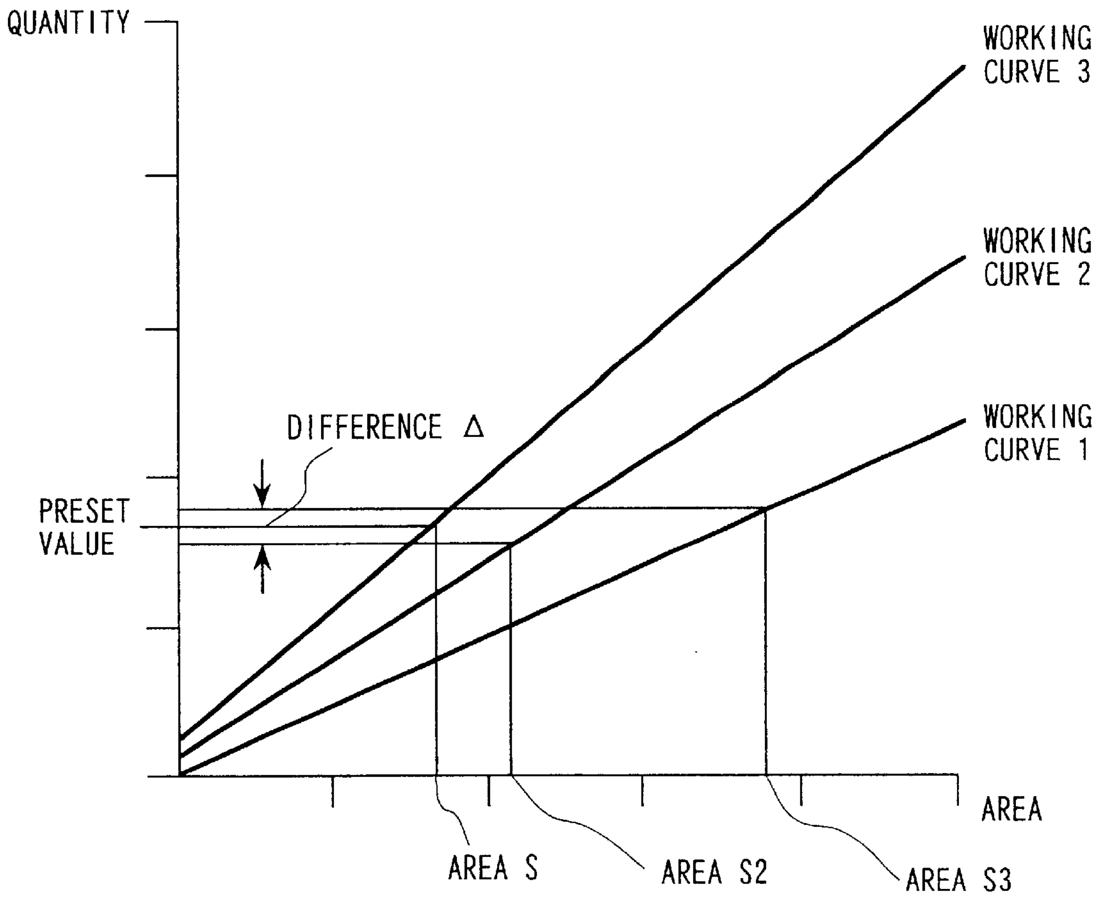
FIG. 4 is a graph to explain one embodiment of the present invention.

As explained above, the daughter ions show the pattern of isotopes in the molecule. Therefore, it is possible to perform quantitative analysis by preparing a working line for each isotope peak. This enables measurement of a plurality of isotope peaks by a single measurement. Further a plurality of quantitative results can be obtained by a single measurement. The obtained quantitative results are expected to be matched ideally, but they may have errors because of chemical noises, device errors, fluctuation of analytical conditions, etc. Quantitative results can be evaluated by managing these errors. For example, if the error of the obtained quantitative value is 10% or less, it is judged that the quantitative measurement has been done correctly. If the error is over 10%, it is judged that the measurement must be done once more. For example, the TCDD daughter ions (m/z257) have peaks (exceeding the isotope ratio of 10%) at m/z257, m/z259, and m/z261. Working lines 1, 2, and 3 are prepared respectively for three isotope peaks in advance as shown in FIG. 4. When areas S1, S2, and S3 of mass chromatographic components of isotopes are obtained, quantitative values Q1, Q2, and Q3 are obtained from working lines 1, 2, and 3. The error $\Delta$ is obtained from these quantitative values Q1, Q2, and Q3. If the error is within a predetermined range, it can be assumed that the quantitative measurement was done correctly. As ions to be measured contain isotopes, the quantitative results should be matched. When the quantitative values and errors are recorded and managed, the reliability of quantitative analysis can be verified later by third parties.

Further, if the sample signals are mixed in with chemical noises or the CID process is insufficient, the isotope patterns of the daughter ions may greatly differ from the calculated values. The isotope patterns can be easily calculated from ion compositions. For example, the m/z257 ion which is one of the daughter ions of TCDD has a formula of $C_{11}H_4OCl_3$ and its isotope pattern for each grid can be obtained as about 27:3:27:3:9:1:1 from m/z257. By comparing this obtained isotope pattern by calculated values, the operator can judge mix-up with chemical noises, CID efficiency, etc. If the isotope ratio is greatly apart from the calculated value, the operator can determine whether the measurement is not acceptable, whether ions of different isotope ratios are excluded from the quantitative measurement, or others. It is recommended to record and display the isotope ratios together with the quantitative results for later judgment of measurement.

The use of internal standard substances is required for measurement of higher accuracy. The internal standard substances are injected together with a sample into the gas chromatographic unit, then transferred to the mass spectrometer, and analyzed under the same conditions as the sample. Usually, a compound obtained by substituting all carbon atoms of the dioxin structure by 13C is used as the internal standard substance.

For the MS/MS analysis of TCDD, the formula of the molecular ion of the sample is $^{12}C_{12}H_4O_2Cl_4$ and the formula of the daughter ion of the internal standard substance is $^{13}C_{12}H_4O_2Cl_4$ and their mass difference is 12.

Figure 9:
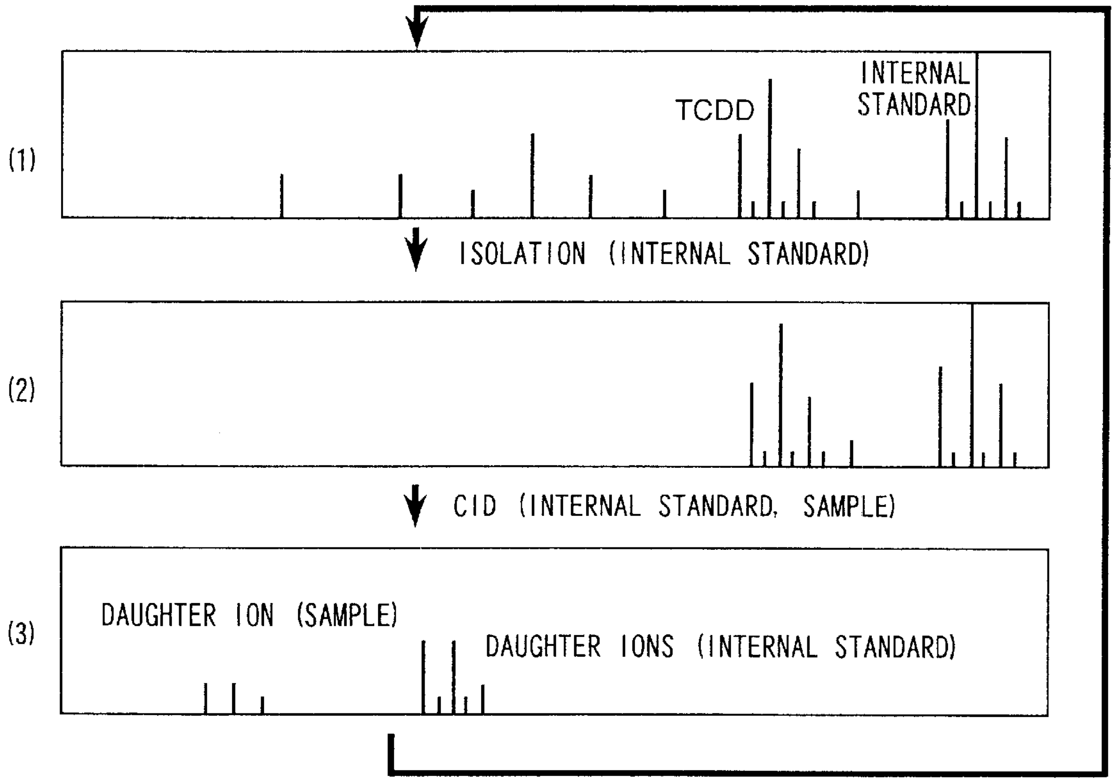
FIG. 9 is a graph to explain one embodiment of the present invention.

Molecular ions m/z320, m/z322, and m/z324 of the sample are high in intensity. Similarly, molecular ions m/z332, m/z334, and m/z336 of the internal standard substance have high intensities. Therefore, the ions m/z320 to m/z336 are made to remain in the ion trapping space 9 (as shown on the center of FIG. 9) and CIDed in the wide range. As the result, the daughter ions are obtained as shown on the bottom of FIG. 9. The current values of the daughter ions m/z257, m/z259, and m/z261 of the sample are accumulated and the current values of the daughter ions m/z268, m/z270, and m/z272 of the internal standard substance are accumulated. The ratio of these sums is calculated and the sample is quantified from the working lines. The method in accordance with the present invention can measure the sample and the internal standard substances by a single step. Accordingly, the measurement time of the method of the present invention is about half as much as that of the conventional MS/MS method (see FIG. 7). Further, the method of the present invention can perform isolation of precursor ions and CID of the sample and the internal standard substances at a time, which can reduce the error of measurement. Isolation of precursor ions in a wide mass range will be more affected by conditional changes and external influences than isolation of ions of a single mass.

The above embodiment used dioxin as an example of analysis of a trace of organic compound. As dioxin has many chlorine atoms in the molecule, the molecular ions and daughter ions are apt to have striking isotope patterns coming from chlorine elements. Elements constituting organic compounds such as carbon C, hydrogen H, nitrogen N, sulfur S, chlorine Cl, and bromine Br all have isotopes. Ions containing a set of these elements show isotope patterns coming from the isotopes on the mass spectrum. Therefore, this invention can be applied to analysis of traces of various organic compounds other than dioxin. Instead of the gas spectrograph which is explained here, chromatograph connected to a mass spectrometer such as liquid chromatograph (LC), capillary zone electrophoresis (CZE), and super critical fluid chromatograph (SFC) are available to this invention.

The method according to the present invention can perform ion trapping mass spectroscopy also on chlorine ions.

The present invention can accomplish high sensitivity and high reliability quantitative analysis by an ion trap mass spectrometer.

What we claim is:

1. A mass spectroscopic method comprising:

forming an ion trapping space having a three dimensional quadruple electric field which is constructed to trap ions whose mass-to-charge ratio is in a selected mass range, generating ions in said trapping space or injecting ions from the outside, and trapping ions whose mass-to-charge ratio is in a selected mass range, holding precursor ions in said trapping space, excluding other ions, performing CID (Collision Induced Dissociation) on the trapped cursor ions to produce daughter ions, trapping the daughter ions in said trapping space, varying the quadruple electric field, and detecting ionic currents of said daughter ions, wherein precursor ions of two masses or more are left in said trapping space and precursor ions of different masses in this mass range are collided, induced, and dissociated at the same time.

2. A mass spectroscopic method in accordance with claim 1 wherein a supplementary a.c. containing frequencies in a range corresponding to the secular frequencies of ions between the minimum and maximum masses of the precursor ions left in the trapping space is applied between end cap electrodes for CD (Collision Induced Dissociation).

3. A mass spectroscopic method in accordance with claim 1 wherein the mass range of precursor ions left in the trapping space is a mass range including ions whose intensities are 5% or more in the precursor ion isotope patterns.

4. A mass spectroscopic method in accordance with claim 1 wherein the mass range of precursor ions left in the trapping space is a mass range including ions whose intensities are 10% or more in the precursor ion isotope patterns.

5. A mass spectroscopic method in accordance with claim 1 wherein the mass range of precursor ions left in the trapping space is a mass range including target precursor ions and precursor ions of internal standard substances.

6. A mass spectroscopic method in accordance with claim 1 wherein the ionic currents of the detected daughter ions are accumulated for quantitative analysis.

7. A mass spectroscopic method in accordance with claim 1 wherein a quantitative analysis is done individually from ionic currents of the detected daughter ions and the results are compared for judgment of measurement.

8. A mass spectroscopic method in accordance with claim 1 wherein an isotope ratio is calculated from ionic currents of the detected daughter ions and compared by a predetermined isotope ratio for evaluation of the measurement.

9. A mass spectroscopic method comprising:

forming an ion trapping space having a three dimensional quadruple electric field which is constructed to trap ions whose mass-to-charge ratio is in a selected mass range, generating ions in said trapping space or injecting ions from the outside, and trapping ions whose mass-to-charge ration is in a selected mass range, holding precursor ions in said trapping space, excluding other ions, performing CID (Collision Induced Dissociation) on the trapped cursor ions to produce daughter ions, trapping the daughter ions in said trapping space, varying the quadruple electric field, and detecting ionic currents of said daughter ions, wherein ions m/z320 to m/z324 are left in the trapping space, collided, induced, and dissociated at the same time to thereby produce daughter ions m/z257 to mz261 for mass spectroscopy of dioxin.

10. A mass spectroscopic method in accordance with claim 9 wherein ions m/z320 to m/z324 are m/z320, m/z322, and m/z324 and their daughter ions are m/z257, m/z259, and m/z261.

11. A mass spectroscopic method in accordance with claim 9 wherein said method further comprises accumulating ionic currents of daughter ions of dioxin m/z257, m/z259, and m/z261, accumulating ionic currents of daughter ions of internal standard substances m/z268, m/z270, and m/z272, and calculating the ratio of these accumulated values for quantitative analysis of dioxin.

* * * * *